United States Patent
Zawadzki et al.

(10) Patent No.: US 12,375,837 B2
(45) Date of Patent: Jul. 29, 2025

(54) WIRELESS DATA TRANSMISSION SYSTEM FOR A POWER UTILITY AND DATA TRANSMISSION METHOD

(71) Applicant: Hitachi Energy Ltd, Zurich (CH)

(72) Inventors: Artur Zawadzki, Cracow (PL); Adam Michalik, Bibice (PL)

(73) Assignee: Hitachi Energy Ltd, Zurich (CH)

( * ) Notice: Subject to any disclaimer, the term of this patent is extended or adjusted under 35 U.S.C. 154(b) by 81 days.

(21) Appl. No.: 17/926,141

(22) PCT Filed: May 17, 2021

(86) PCT No.: PCT/EP2021/063032
§ 371 (c)(1),
(2) Date: Nov. 18, 2022

(87) PCT Pub. No.: WO2021/233848
PCT Pub. Date: Nov. 25, 2021

(65) Prior Publication Data
US 2023/0188873 A1    Jun. 15, 2023

(30) Foreign Application Priority Data

May 18, 2020 (EP) ..................... 20175289

(51) Int. Cl.
*H04Q 9/02* (2006.01)
*H02J 13/00* (2006.01)

(52) U.S. Cl.
CPC ......... *H04Q 9/02* (2013.01); *H02J 13/00002* (2020.01); *H02J 13/00022* (2020.01); *H02J 13/00028* (2020.01); *H04Q 2209/40* (2013.01)

(58) Field of Classification Search
CPC . H04Q 9/02; H04Q 2209/40; H02J 13/00002; H02J 13/00022;
(Continued)

(56) References Cited

U.S. PATENT DOCUMENTS

| 6,140,810 A | 10/2000 | Bohnert et al. |
| 2003/0087615 A1* | 5/2003 | Randall ................. G01D 4/002 |
| | | 455/127.1 |

(Continued)

FOREIGN PATENT DOCUMENTS

| CN | 107449806 A | 12/2017 |
| EP | 0907084 A2 | 4/1999 |

(Continued)

OTHER PUBLICATIONS

International Search Report and Written Opinion of the International Searching Authority, PCT/EP2021/063032, mailed Jun. 29, 2021, 18 pages.

(Continued)

*Primary Examiner* — Amine Benlagsir
(74) *Attorney, Agent, or Firm* — Sage Patent Group (57) ABSTRACT

A wireless data transmission system for transmitting measurement data of a power utility is adapted such that the measurement data is transmitted in a first operating mode and wireless transmission of the measurement data is paused in a second operating mode. The wireless data transmission system operates in the first or second operating mode as a function of temperature.

19 Claims, 5 Drawing Sheets

(58) Field of Classification Search
CPC .......... H02J 13/00028; H02J 13/00026; Y02E 60/00; Y04S 40/126
See application file for complete search history.

(56) References Cited

U.S. PATENT DOCUMENTS

| | | |
|---|---|---|
| 2009/0161726 A1 | 6/2009 | Miyamoto et al. |
| 2009/0312881 A1 | 12/2009 | Venturini Cheim et al. |
| 2011/0257924 A1 | 10/2011 | Bryant et al. |
| 2012/0092114 A1* | 4/2012 | Matthews ............. H01F 27/402 336/107 |
| 2014/0074309 A1* | 3/2014 | Wu .......................... H02J 3/00 700/297 |
| 2014/0195063 A1* | 7/2014 | Wu ..................... H04L 12/2818 700/295 |
| 2014/0248802 A1* | 9/2014 | Hieda ................. H04L 12/2825 439/620.01 |

FOREIGN PATENT DOCUMENTS

| | | | |
|---|---|---|---|
| FR | 2513432 A1 | 3/1983 | |
| JP | H01284722 A | 11/1989 | |
| JP | H0638357 A * | 2/1994 | ............... G05F 1/10 |

OTHER PUBLICATIONS

Extended European Search Report mailed Oct. 14, 2020 for European Patent Application No. 20175289.6, 10 pages.

* cited by examiner

WIRELESS DATA TRANSMISSION SYSTEM FOR A POWER UTILITY AND DATA TRANSMISSION METHOD

CROSS REFERENCE TO RELATED APPLICATIONS

This application is a 35 U.S.C. § 371 national stage application of PCT International Application No. PCT/EP2021/063032 filed on May 17, 2021, which in turn claims foreign priority to European Patent Application No. 20175289.6, filed on May 18, 2020, the disclosures and content of which are incorporated by reference herein in their entirety.

FIELD OF THE INVENTION

The disclosure relates to techniques for transmitting measurement data. The disclosure relates in particular to techniques suitable for transmitting data captured in or on a power utility, such as a power transformer.

BACKGROUND OF THE INVENTION

Modern power utilities, such as power transformers, circuit breakers, or other components used for power generation, transmission, and/or distribution are equipped with a variety of sensors. With increasing automation of electric systems, data processing is enhanced and the number of sensors tends to increase further.

In some power utilities, the sensors may be exposed to high temperatures. For illustration, hot spots in transformers may, at least intermittently, have temperatures in excess of 125° C., such as between 125° C. and 140° C. Wire or fiber-optic based communication techniques can withstand such temperatures, but the required wiring adds to the complexity of the installation and may make maintenance challenging. Many conventional wireless communication chips do not remain operative at such elevated temperatures, even though they are able to withstand such temperatures and can return to an operative mode when the temperature drops again. Dedicated special-purpose wireless communication chips that can continue to transmit measurement data at such elevated temperatures significantly add to the cost and complexity.

SUMMARY

There is a need to provide improved systems and methods for transmitting measurement data. There is in particular a need for improved systems and methods for transmitting measurement data captured in or on an electric power utility, such as a power transformer, that do not include communication chips capable of continuing transmission in an elevated range of temperatures to which the communication chip may intermittently be subjected.

According to embodiments of the disclosure, a wireless data transmission system and transmission method are provided.

The wireless data transmission system has a first operating mode in which measurement data may be wirelessly transmitted continually, i.e., on an ongoing basis. The wireless data transmission system has a second operating mode in which measurement data are not wirelessly transmitted. In the second operating mode, the measurement data may be buffered. Upon return to the first operating mode, the buffered measurement data may be transmitted together with buffered time information.

A transition between the first and second operating states may be temperature-triggered. For illustration, an integrated circuit (IC), such as a processor, may cause the wireless data transmission system to transition from the first operating mode in which data is transmitted to the second operating mode in which measurement data transmission is paused when the temperature reaches or exceeds a threshold temperature. The IC may cause the wireless data transmission system to return to the first operating mode when the falls below the threshold temperature. Return to the first operating mode may trigger the transmission of the buffered measurement data.

A wireless measurement data transmission system for transmitting measurement data of a power utility, in particular of a power transformer, according to an embodiment comprises a circuit. The circuit is adapted to cause wireless transmission of measurement data via at least one wireless transmission element in a first operating mode of the wireless data transmission system, and determine, based on temperature, whether the wireless data transmission system is to transition into a second operating mode in which wireless transmission of the measurement data is paused.

The circuit may comprise a wireless communication chip. In the second operating mode, the wireless communication chip may be deactivated. The wireless transmission element may be an antenna coupled to the wireless communication chip.

The circuit may comprise a memory or buffer to buffer the measurement data while the wireless data transmission system is in the second operating mode.

The circuit may be adapted to buffer the measurement data in combination with time information.

The circuit may be adapted to cause transmission of the buffered measurement data when the wireless data transmission system returns to the first operating mode.

The circuit may be adapted such that a transition from the first operating mode to the second operating mode may be triggered by the temperature reaching or exceeding a threshold temperature.

The threshold temperature may be set based on the wireless communication chip of the circuit.

The threshold temperature may be set to be lower than a temperature at which the wireless communication chip of the circuit stops working reliably, but which may be intermittently exceeded without damaging the wireless communication chip when the wireless communication chip is not powered.

The threshold temperature may be greater than 85° C., at least 100° C., at least 120° C., or at least 125° C.

The circuit may be adapted to temporarily interrupt a power supply to the wireless communication chip in response to the temperature reaching or exceeding the threshold temperature.

The circuit may be adapted to re-establish a power supply to the wireless communication chip in response to the temperature falling below the threshold temperature.

The circuit may comprise a controllable switch, in particular a controllable semiconductor switch. The circuit may comprise an integrated circuit, e.g. a processor, adapted to control the controllable switch.

The circuit may comprise a first circuit part and a second circuit part operable to drive the at least one wireless transmission element.

The first circuit part may be adapted to selectively deactivate the second circuit part based on the temperature.

The first circuit part may be adapted to selectively disconnect the second circuit part from a power supply based on the temperature.

The circuit may further comprise a controllable switching element interconnected between the power supply and the second circuit part.

The first circuit part may be coupled to a control terminal of the controllable switching element.

The first circuit part may be adapted to selectively deactivate the second circuit part based on a temperature threshold comparison. As mentioned above, the temperature threshold comparison may include a comparison to a threshold temperature which may be greater than 85° C., at least 100° C., at least 120° C., 125° C. or more than 125° C.

The first circuit part may be coupled to the second circuit part via a digital data interface to provide the measurement data to the second circuit part for transmission.

The first circuit part may comprise a first integrated circuit adapted to cause the measurement data to be provided to the second circuit part for transmission in the first operating mode and cause the measurement data to be stored in a buffer or memory of the first circuit part in the second operating mode.

The first integrated circuit may be adapted to cause the measurement data stored in the buffer or memory to be provided to the second circuit part for transmission when the wireless data transmission system returns from the second operating mode to the first operating mode.

The first integrated circuit may be adapted to cause the measurement data to be stored in the buffer or memory with timing information.

The first integrated circuit may be adapted to cause the measurement data stored in the buffer or memory to be provided to the second circuit part with the timing information for transmission.

The second circuit part may comprise a second integrated circuit.

The second integrated circuit may be a wireless communication chip.

The wireless data transmission system may comprise a printed circuit board on which the first circuit part and the second circuit part are mounted.

The wireless data transmission system may comprise the at least one wireless transmission element.

The at least one wireless transmission element may be an antenna.

The antenna may be mounted on the printed circuit board.

The antenna may be mounted separately from the circuit.

The wireless data transmission system may be adapted such that it receives the measurement data from a separate sensor. The circuit of the wireless data transmission system may further comprise one or several digital input interfaces adapted to receive the measurement data from at least one sensor and/or one or several analog input interfaces adapted to receive measurement signals from at least one sensor.

The wireless data transmission system may be a sensor device that comprises the sensor.

The sensor may be a temperature sensor, moisture or water content level sensor, pressure sensor, cellulose decomposition products sensor (for example a sensor for sensing a presence or concentration of one or several of: 2-furfuryl alcohol, 2-furaldehyde (furfural), 2-acetylfuran and 5-methylfurfural, 5-hydroxy-methyl-cellulose, methanol, ethanol, etc.) and/or proximity sensor, without being limited thereto.

The sensor may be a digital sensor.

The sensor may be an analog sensor.

When the measurement data to be transmitted includes data captured by a temperature sensor, the wireless data transmission system may use the measurement data to determine the temperature that triggers transitions between the first and second operating modes (e.g., by using this measurement data for performing the threshold comparison).

The wireless data transmission system may comprise a temperature sensor to sense the temperature that triggers transitions between the first and second operating modes (e.g., by using this measurement data for performing the threshold comparison). The temperature sensor may be integrated into the wireless data transmission system.

The wireless data transmission system may further comprise a housing in which the circuit and optionally the wireless data transmission element are housed.

The wireless data transmission system may be an integral unit having one or several digital input interfaces and/or one or several analog input interfaces for interfacing the wireless data transmission system with various sensors.

The various sensors may include one or several of a temperature sensor, moisture or water content level sensor, pressure sensor, cellulose decomposition products sensor (for example a sensor for sensing a presence or concentration of one or several of: 2-furfuryl alcohol, 2-furaldehyde (furfural), 2-acetylfuran and 5-methylfurfural, 5-hydroxy-methyl-cellulose, methanol, ethanol, etc.), and/or proximity sensor, without being limited thereto.

An electric power utility according to an embodiment may comprise an enclosure and at least one wireless data transmission system according to any one of the preceding embodiments.

The wireless data transmission system may be installed within the enclosure.

When the enclosure is made of a material through which radio frequencies are transmittable, the wireless data transmission element (e.g., the antenna) may be installed within the enclosure.

When the enclosure is made of a material that strongly attenuates or blocks transmission of radio frequencies, the wireless data transmission element (e.g., the antenna) may be installed outside the enclosure and may be electrically connected to the circuit through the enclosure.

The electric power utility may be a power transformer.

The enclosure may be a transformer cabinet, a transformer housing, or a transformer tank.

A method of transmitting measurement data captured in or on a power utility, in particular a power transformer, comprises wirelessly transmitting, by a wireless data transmission system, measurement data in a first operating mode of the wireless data transmission system. The method further comprises determining, by the wireless data transmission system, based on a temperature whether the wireless data transmission system is to transition into a second operating mode in which wireless transmission of the measurement data may be paused.

The wireless data transmission system may comprise a wireless communication chip. The method may comprise deactivating the wireless communication chip when the wireless data transmission system transitions into the second operating mode.

Deactivating the wireless communication chip may comprise interrupting a power supply to the wireless communication chip.

The method may further comprise buffering the measurement data while the wireless data transmission system is in the second operating mode.

The method may further comprise buffering time information associated with the measurement data.

The method may further comprise transmitting the buffered measurement data when the wireless data transmission system returns to the first operating mode.

A transition from the first operating mode to the second operating mode may be triggered by the temperature reaching or exceeding a threshold temperature.

The threshold temperature may be set based on the wireless communication chip of the circuit.

The threshold temperature may be set to be lower than a temperature at which the wireless communication chip of the circuit stops working reliably, but which may be intermittently exceeded without damaging the wireless communication chip when the wireless communication chip is not powered.

The threshold temperature may be greater than 85° C., at least 100° C., at least 120° C., or at least 125° C.

The method may comprise temporarily interrupting a power supply to the wireless communication chip in response to the temperature reaching or exceeding the threshold temperature.

The method may comprise re-establishing a power supply to the wireless communication chip in response to the temperature falling below the threshold temperature.

The method may comprise controlling a controllable switch, in particular a controllable semiconductor switch, to interrupt and re-establish the power supply to the wireless communication chip.

The wireless data transmission system may comprise a first circuit part and a second circuit part operable to drive the at least one wireless transmission element.

The first circuit part may selectively deactivate the second circuit part based on the temperature.

The first circuit part may selectively disconnect the second circuit part from a power supply based on the temperature.

The wireless data transmission system may further comprise a controllable switching element interconnected between the power supply and the second circuit part.

The first circuit part may be coupled to a control terminal of the controllable switching element.

The method may comprise selectively deactivating the second circuit part based on a temperature threshold comparison. The temperature threshold comparison may include a comparison to a threshold temperature which may be greater than 85° C., at least 100° C., at least 120° C., 125° C. or more than 125° C.

The method may comprise providing, by the first circuit part, the measurement data to the second circuit part via a digital data interface for transmission.

The first circuit part may comprise a first integrated circuit. The method may comprise causing, by the first integrated circuit, the measurement data to be provided to the second circuit part for transmission in the first operating mode and causing the measurement data to be stored in a buffer or memory of the first circuit part in the second operating mode.

The method may comprise causing, by the first integrated circuit, the measurement data stored in the buffer or memory to be provided to the second circuit part for transmission when the wireless data transmission system returns from the second operating mode to the first operating mode.

The method may comprise causing, by the first integrated circuit, the measurement data to be stored in the buffer or memory with timing information.

The method may comprise causing, by the first integrated circuit, the measurement data stored in the buffer or memory to be provided to the second circuit part with the timing information for transmission.

The second circuit part may comprise a second integrated circuit.

The second integrated circuit may be a wireless communication chip.

The method may comprise receiving, by the wireless data transmission system, the measurement data from a separate sensor. The wireless data transmission system may further comprise one or several digital input interfaces to receive the measurement data from the sensor and/or one or several analog input interfaces to receive measurement signals from the sensor.

The method may comprise sensing the measurement data.

The measurement data may be temperature, moisture or water content level, pressure, cellulose decomposition product concentrations (for example concentrations of 2-furfuryl alcohol, 2-furaldehyde (furfural), 2-acetylfuran and 5-methylfurfural, 5-hydroxy-methyl-cellulose, methanol, ethanol, etc.), and/or proximity, without being limited thereto.

When the measurement data includes temperature, the wireless data transmission system may use the measurement data to determine the temperature that triggers transitions between the first and second operating modes (e.g., by using this measurement data for performing the threshold comparison).

The wireless data transmission system may comprise a temperature sensor to sense the temperature that triggers transitions between the first and second operating modes (e.g., by using this measurement data for performing the threshold comparison). The temperature sensor may be integrated into the wireless data transmission system.

The wireless data transmission system may be installed in an enclosure of an electric power utility.

The electric power utility may be a power transformer.

The enclosure may be a transformer tank.

When the enclosure is made of a material through which radio frequencies are transmittable, the wireless data transmission element (e.g., the antenna) may be installed within the enclosure.

When the enclosure is made of a material that strongly attenuates or blocks transmission of radio frequencies, the wireless data transmission element (e.g., the antenna) may be installed outside the enclosure and may be electrically connected to the circuit through the enclosure.

The wireless data transmission system may be adapted for unidirectional communication to a receiver positioned outside the enclosure of the power utility.

The wireless data transmission system may be adapted for bidirectional communication. I.e., the wireless data transmission system is not limited transmitting the measurement data to a receiver, but can also receive data, as long as it is capable of performing the data transmission to the receiver.

The following items are embodiments of the disclosure:

Item 1: A wireless data transmission system for transmitting measurement data of a power utility, in particular of a power transformer, comprising: a circuit adapted to cause wireless transmission of the measurement data via at least one wireless transmission element in a first operating mode of the wireless data transmission system, and determine, based on temperature, whether the wireless data transmission system is to transition into a second operating mode in which wireless transmission of the measurement data is paused.

Item 2: The wireless data transmission system of item 1, wherein the circuit comprises: a first circuit part; and a second circuit part operable to drive the at least one wireless transmission element; wherein the first circuit part is adapted to selectively activate and deactivate the second circuit part based on the temperature.

Item 3: The wireless data transmission system of item 2, wherein the first circuit part is adapted to selectively disconnect the second circuit part from a power supply based on the temperature, optionally wherein the circuit further comprises a controllable switching element interconnected between the power supply and the second circuit part, the first circuit part being coupled to a control terminal of the controllable switching element.

Item 4: The wireless data transmission system of item 2 or item 3, wherein the first circuit part is adapted to selectively activate and deactivate the second circuit part based on a temperature threshold comparison.

Item 5: The wireless data transmission system of any one of items 2 to 4, wherein the first circuit part is coupled to the second circuit part via a digital data interface to provide the measurement data to the second circuit part for transmission.

Item 6: The wireless data transmission system of any one of items 2 to 5, wherein the first circuit part comprises a first integrated circuit adapted to cause the measurement data to be provided to the second circuit part for transmission in the first operating mode and cause the measurement data to be stored in a buffer or memory of the first circuit part in the second operating mode.

Item 7: The wireless data transmission system of item 6, wherein the first integrated circuit is adapted to cause the measurement data stored in the buffer or memory to be provided to the second circuit part for transmission when the wireless data transmission system returns from the second operating mode to the first operating mode.

Item 8: The wireless data transmission system of item 6 or item 7, wherein the first integrated circuit is adapted to cause the measurement data to be stored in the buffer or memory with timing information and/or to cause the measurement data stored in the buffer or memory to be provided to the second circuit part with the timing information for transmission.

Item 9: The wireless data transmission system of any one of items 2 to 8, wherein the second circuit part comprises a second integrated circuit, optionally wherein the second integrated circuit is a wireless communication processor or microprocessor.

Item 10: The wireless data transmission system of any one of the preceding items, wherein the at least one wireless transmission element is an antenna.

Item 11: The wireless data transmission system of any one of the preceding items, wherein the wireless data transmission system further comprises a sensor to capture the measurement data or a digital or analog input interface adapted to receive the measurement data or a measurement signal from the sensor, optionally wherein the sensor is a digital or analog sensor; and/or wherein a temperature sensor adapted to measure the temperature is coupled to the circuit or comprised by the circuit.

Item 12: The wireless data transmission system of any one of the preceding items, further comprising a housing in which the circuit is housed, optionally wherein the at least one wireless transmission element is housed in the housing or optionally wherein the at least one wireless transmission element is arranged externally of the housing.

Item 13: An electric power utility, comprising: an enclosure; and at least one wireless data transmission system according to any one of the preceding items installed within the enclosure.

Item 14: The electric power utility of item 13, wherein the electric power utility is a transformer and the enclosure is a transformer cabinet, a transformer housing, or a transformer tank.

Item 15: A method of transmitting measurement data captured in or on a power utility, in particular a power transformer, comprising: wirelessly transmitting, by a wireless data transmission system, measurement data in a first operating mode of the wireless data transmission system, and determining, by the wireless data transmission system, based on a temperature whether the wireless data transmission system is to transition into a second operating mode in which wireless transmission of the measurement data is paused.

Various effects and advantages are associated with the disclosure. The disclosure allows wireless data transmission of measurement data to be used for a power utility, such as a transformer. The installation space, cost, and maintenance issues associated with fiber optic techniques are mitigated. Versatile positioning is attained. The same wireless data transmission system may be used for any one of a variety of different digital and/or analog sensors. The provision of plural operating modes allows intermittent increases in temperature to temperature ranges that intermittently adversely affect the operation of wireless communication chips, but do not cause lasting damage to the wireless communication chips to be accommodated. The data transmission can be paused when and while the temperature is in an interval at which the wireless communication chip is not guaranteed to work reliably. By buffering and transmitting the measurement data with time information once the temperature has dropped below a temperature threshold, the full information remains available, albeit with some delay.

The disclosure allows a wider variety of communication chips to be used. For illustration, the disclosure allows communication chips that can withstand the temperatures present in the power utility to be used even when the temperature intermittently reaches values at which the communication chip does no longer operate reliably. This allows less costly communication chips to be used. Some communication chips may stop operating reliably when the temperature exceeds 125° C., but are able to withstand the typical temperatures of up to 140° C. that may be encountered in power transformer enclosures. Such communication chips may be used in embodiments of the disclosure, without having to rely on more complex fiber optics solutions.

BRIEF DESCRIPTION OF THE DRAWINGS

The subject-matter of the disclosure will be explained in more detail with reference to preferred exemplary embodiments which are illustrated in the attached drawings, in which.

DETAILED DESCRIPTION OF EMBODIMENTS

Exemplary embodiments of the disclosure will be described with reference to the drawings in which identical or similar reference signs designate identical or similar elements. While some embodiments will be described in the context of a data transmission system installed in an enclosure of a power transformer, the embodiments are not limited thereto. The features of embodiments may be combined with each other, unless specifically noted otherwise.

According to embodiments of the disclosure, a wireless data transmission system may be provided in a transformer tank or in another power utility. The wireless data transmission system is or comprises an electronic circuit, which
- is designed to work in a high temperature environment,
- is capable of communicating up to a threshold level (e.g. 125° C.), and
- is equipped with a mechanism which switches operating mode from a first (e.g., on-line) mode to a second (e.g., off-line) mode when temperature exceeds threshold level. In the second operating mode, measured data is buffered in an internal memory and can be sent when temperature drops again below the threshold level.

The wireless data transmission system may have data input interface(s) for receiving the measurement data from one or several sensors.

It will be appreciated that, as used herein, the term "wireless data transmission system" encompasses a transmitter circuit. The term "wireless data transmission system" does not imply that a receiver component is also included in the system. A transmission antenna may be included in the wireless data transmission system or may be coupled thereto.

Figure 1:
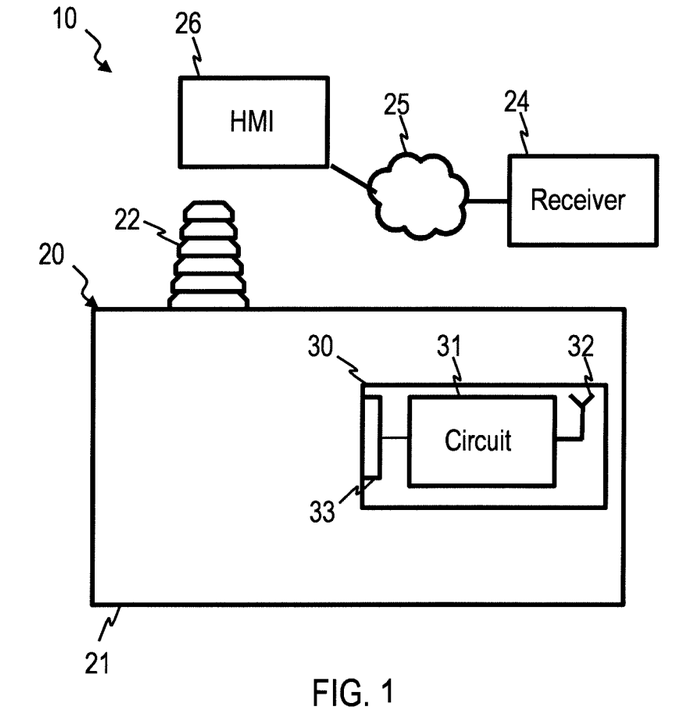
FIG. 1 is a schematic view of a power transformer system comprising a wireless data transmission system according to an embodiment.

FIG. 1 is a schematic view of a transformer system 10 according to an embodiment. The transformer system 10 comprises a transformer 20 having a tank 21. The transformer 20 includes various conventional transformer components, such as an active part and bushings 22.

Figure 9:
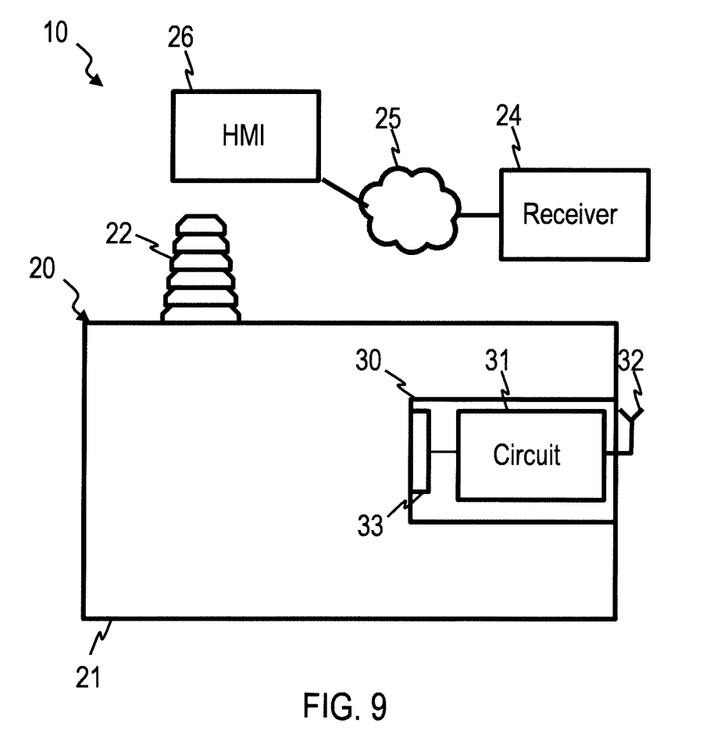
FIG. 9 is a schematic view of a power transformer system comprising a wireless data transmission system according to an embodiment.

A wireless data transmission system 30 has a circuit 31 that is arranged within an enclosure of a power utility. For illustration, the circuit of the wireless data transmission system 30 may be arranged within the tank 21 or another transformer enclosure. The wireless data transmission system 30 may have a wireless transmission element, which may be implemented by an antenna 32. The antenna 32 may be adapted to transmit electromagnetic radiation. The wireless transmission element may be arranged within the enclosure of the power utility (as shown in FIG. 1) or may be provided externally of the enclosure (as shown in FIG. 9).

The wireless data transmission system 30 may have one or several data input interface(s) 33. The one or several data input interface(s) 33 may be connected to one or several sensor(s) positioned within the enclosure of the power utility (not shown in FIG. 1). The sensor(s) may also be integrated with the wireless data transmission system 30. I.e., the wireless data transmission system 30 may be a combined sensor and transmission unit. In this case, data input interface(s) 33 for providing measurement data to the wireless data transmission system 30 may be omitted.

The wireless data transmission system 30 has the circuit 31. The circuit 31 is adapted to drive the wireless transmission element 32. The circuit 31 is adapted such that the wireless data transmission system 30 can operate in two operating modes. In a first operating mode, measurement data is transmitted via the data transmission element 32 in an ongoing manner. The data transmission does not need to be continuous in the first operating mode, but happens on an ongoing basis, i.e., continually. For illustration, data transmission may be performed with a repetition interval, which may be constant or variable. In a second operating mode, transmission of the measurement data is paused and the measurement data is buffered with time information that indicates the time at which the respective measurement data element was captured by the sensor or received by the wireless data transmission system 30. The buffered measurement data with time information may be transmitted in response to the wireless data transmission system 30 returning to its first operating mode.

A transition from the first operating mode to the second operating mode may be governed by temperature. A transition from the second operating mode to the first operating mode may also be governed by temperature. The wireless data transmission system 30 may automatically transition from the first operating mode to the second operating mode in response to the temperature reaching or exceeding a threshold temperature. The wireless data transmission system 30 may automatically transition from the second operating mode to the first operating mode in response to the temperature falling below the same or another threshold temperature.

While the wireless data transmission system 30 is in the second operating mode, no data transmissions take place. The data transmissions are resumed only when the wireless data transmission system 30 returns to the first operating mode, e.g., in response to a temperature-based trigger event. The timing at which data transmissions take place in the first operating mode (e.g., the repetition interval between successive transmission) is typically independent of temperature, as long as the wireless data transmission system 30 stays in the first operating mode.

The temperature may be sensed using various techniques. For illustration, a temperature sensor mounted on a circuit board of the circuit 31 may sense the temperature in proximity to a wireless communication chip. Other temperature measurements may be used. A transformer insulation fluid or a temperature measurement at a transformer winding may be used for a temperature threshold comparison. Such a temperature measurement provides information on the temperature range to which an integrated circuit (IC) for wireless communication in the wireless data transmission system 30 is being exposed.

The wireless data transmission system 30 causes transmission of the measurement data. When the enclosure allows radio frequency waves transmitted by the wireless data transmission system 30 to pass through the enclosure of the power utility (e.g., through the transformer tank 21), the wireless transmission element may be positioned within the enclosure. The wireless data transmission system 30 may transmit the measurement data from within the enclosure to a receiver 24 positioned outside the enclosure.

When the enclosure does not allow radio frequency waves transmitted by the wireless data transmission system 30 to pass through the enclosure of the power utility (e.g., through the transformer tank 21), the wireless transmission element may be positioned outside the enclosure. The circuit 31 of the wireless data transmission system 30 may be positioned within the enclosure and may drive the wireless transmission element that is positioned outside the enclosure.

The measurement data may be processed by one or several computing devices. The one or several computing devices may be arranged locally or remotely from the power utility. The receiver may provide the measurement data or data derived therefrom to the one or several computing devices via a Wide Area Network (WAN) or the internet 25. The measurement data may be passed through a gateway for relaying it to a cloud-based computing system.

Results of processing of the measurement data, such as status information, warnings, alerts, or other outputs, may be generated and output via a human-machine interface (HMI) 26.

Figure 2:
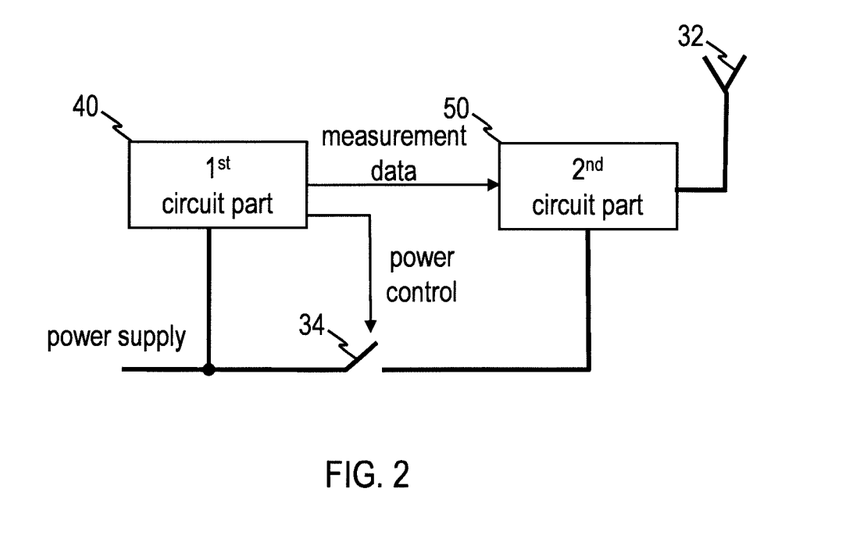
FIG. 2 is a circuit diagram of a wireless data transmission system according to an embodiment.

FIG. 2 is a circuit diagram of the wireless data transmission system 30. The circuit 31 of the wireless data transmission system may comprise a first circuit part 40 and a second circuit part 50. The first circuit part 40 may have a power supply input connected to a power supply line. The second circuit part 50 may have a power supply input connected to the power supply line via a controllable switch 34.

The second circuit part 50 may be or may include an integrated circuit that performs wireless communication tasks. The integrated circuit may be a processor, a microprocessor, a controller, a microcontroller, an application specific integrated circuit (ASIC), a Field Programmable Gate Array (FGPA), or a combination of such ICs. The second circuit part 50 may be or may include a wireless communication chip.

The second circuit part 50 may be adapted for generating symbols for transmission based on measurement data, performing modulation, and/or controlling a driver circuit that drivers the wireless transmission element 32.

The first circuit part 40 may be adapted to control whether power is supplied to the second circuit part 50 or may otherwise control whether the second circuit part 50 is operative or inoperative. The first circuit part 40 may be adapted to control a controllable switch 34 to selectively connect and/or disconnect the second circuit part 50 to a power supply. The first circuit part 40 may have an output coupled to a control terminal of the controllable switch 34 to connect and/or disconnect the second circuit part 50 to and from the power supply.

The first circuit part 40 may be adapted to
output measurement data to the second circuit part 50 for transmission while the second circuit part 50 is connected to the power supply in a first operating mode;
deactivate the second circuit part 50 (e.g., by disconnecting it from the power supply) and cause the measurement data to be buffered without outputting them to the second circuit part 50 in a second operating mode;
output buffered measurement data to the second circuit part 50 for transmission in response to a return to the first operating mode; and
determine based on a temperature (that may be sensed locally at or in the wireless data transmission system 30 or otherwise within the enclosure of the power utility) whether the wireless data transmission system 30 is to operate in the first or second operating mode at any given point in time.

The first circuit part 40 may include an integrated circuit, a buffer or memory, and a digital interface for outputting the measurement data to the second circuit part 50 for performing these functions, as will be described in more detail below. The integrated circuit may be a processor, a microprocessor, a controller, a microcontroller, an application specific integrated circuit (ASIC), a Field Programmable Gate Array (FGPA), or a combination of such ICs.

During operation of the wireless data transmission system 30, the second circuit part 50 remains in operation only until the temperature reaches or exceed a threshold temperature (which may be at least 85° C., at least 100° C., at least 120°, 125° C. or more than 125° C.), and is deactivated when the temperatures reaches or exceeds the threshold temperature. The first circuit part 40 remains in operation in at least a temperature range above the threshold temperature (for illustration up to temperatures of at least 140° C., at least 145° C. or at least 150° C.). The temperature thresholds can vary, e.g., depending on the power utility in which the wireless data transmission system 30 is used or depending on whether the temperature measurement is at the second circuit part 50 or elsewhere.

Thus, the circuit 31 of the wireless data transmission system 30 is sub-divided into two parts. The two parts may each include an integrated circuit, so that the wireless data transmission system 30 may be implemented as a dual-chip or dual-processor system.

The first circuit part 40 (which may also be referred to as a "high temperature part" because it remains operative at elevated temperatures above the threshold temperature), is preferably active in the whole temperature range to which the wireless data transmission system 30 may be exposed. The first circuit part 40 may be responsible for the measurement process with one or several sensors. The one or several sensors may be integrated into the first circuit part 40, or the first circuit art 40 may have an input interface for receiving the measurement data from sensor(s). Measured values can be stored, with timestamps, into an internal memory of the first circuit part 40.

The second circuit part 50 (which may also be referred to as a "low temperature part" because it remains operative only at temperatures up to the threshold temperature), is active only in temperatures up to threshold level (e.g. 125° C.). The second circuit part 50 is responsible for radio data transmission to the receiver 24. The second circuit part 50 receives data with measurements from the first circuit part 40 when the temperature is below the threshold temperature.

When the temperature is less than the threshold level (e.g. 125° C.), the wireless data transmission system 30 works in the first operating mode (which may be considered an on-line mode). All values measured or received by the first circuit part 40 are provided to the second circuit part 50, which is powered. The second circuit part 50 transmits the data through the wireless radio interface to the receiver 24. In this mode, measured values are available on-line, i.e., on an ongoing basis during operation. The measured values may be processed for performing control or monitoring functions, and/or for generating output for outputting via the HMI 26.

When the temperature raises and reaches or exceeds the threshold level, then the wireless data transmission system 30 works in off-line mode. Switching between on-line and off-line modes is handled by the first circuit part 40, based on the temperature measurement.

By selectively de-activating the second circuit part 50, the second circuit part 50 is not powered at high temperatures. The components of the second circuit part 50 only need to withstand the higher temperatures, but do not need to operate under such elevated temperatures. Such "storage temperatures" (that specify under which temperatures the second circuit part 50 may be kept without being damaged) are much higher than the operating temperatures under which the second circuit part 50 is capable of operating.

During the second operating mode, all measured values are buffered into the internal memory of the first circuit part 40 and not transmitted by the radio. Thus, at that time, the user or the processing components connected to the receiver unit 24 only have the information that the threshold temperature is exceeded, but measurement data is no longer transmitted on an ongoing basis.

When the temperature drops again below the threshold level (preferably with some hysteresis), the second circuit part 50 can be powered on by the first circuit part 40. The first circuit part 40 can send all buffered data to the second circuit part 50 and the second circuit part 50 can transmit it by the radio to the receiver unit 24. At that time, all missing measurement taken during high temperature episode become available.

Figure 3:
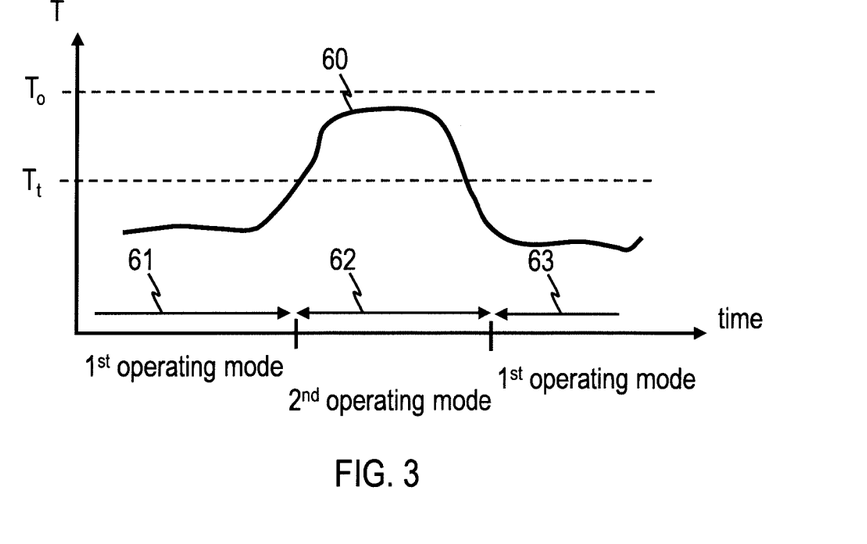
FIG. 3 is a graph illustrating operation of the wireless data transmission system according to an embodiment.
Figure 4:
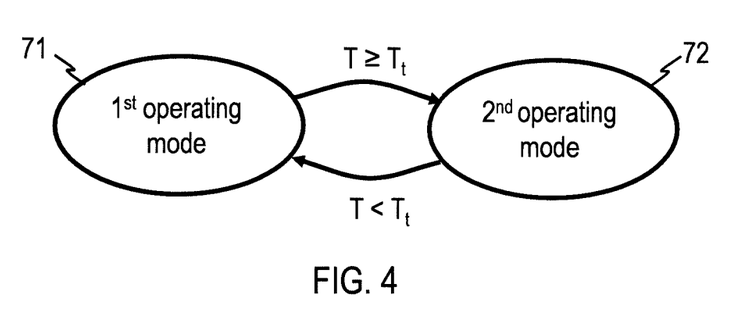
FIG. 4 is a state diagram of a wireless data transmission system according to an embodiment.

FIGS. 3 and 4 illustrate operation of the wireless data transmission system.

FIG. 3 shows a temperature 60 as a function of time. In a first time period 61, the temperature is below a threshold temperature $T_t$. The wireless data transmission system 30 operates in its first operating mode. Sensed data are continually transmitted in the first operating mode. Both the first circuit part 40 and the second circuit part 50 are powered.

In a second time period 62, there is a temperature excursion to temperatures above the threshold temperature $T_t$. Transmission of measurement data is paused during the second time period 62. The measurement data sensed by one or several sensor(s) in the enclosure of the power utility is buffered with associated time information, which may be time stamps.

In a third time period 63, the temperature has fallen again to values below the threshold temperature $T_t$. This triggers a transmission of the buffered measurement data with the associated time information. Measurement data is again transmitted continually.

The first circuit part 40 remains operative in a temperature range that exceeds the threshold temperature $T_t$ and that may reach an upper operation temperature $T_o$. The upper operation temperature $T_o$ may reflect the maximum temperature to which the wireless data transmission system 30 is typically exposed during operation.

FIG. 4 shows a diagram illustrating the first operating mode 71 and the second operating mode 72 of the wireless data transmission system. In the first operating mode 71, both the first circuit part 40 and the second circuit part 50 are powered and measurement data is transmitted. In the second operating mode 72, the first circuit part 40 is powered, the second circuit part 50 is not powered, measurement data is buffered and no transmission via the wireless transmission element 32 takes place. Transitions between the first and second operating modes 71, 72 are temperature-triggered.

Figure 5:
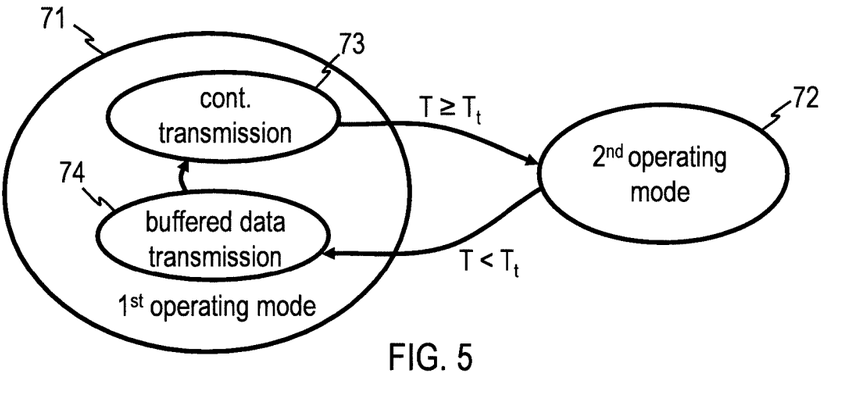
FIG. 5 is a state diagram of a wireless data transmission system according to an embodiment.

FIG. 5 shows a diagram illustrating the first operating mode 71 and the second operating mode 72 of the wireless data transmission system. In the first operating mode 71, both the first circuit part 40 and the second circuit part 50 are powered and measurement data is transmitted. In the second operating mode 72, the first circuit part 40 is powered, the second circuit part 50 is not powered, measurement data is buffered and no transmission via the wireless transmission element 32 takes place. Transitions between the first and second operating modes 71, 72 are temperature-triggered.

The first operating mode 71 has a first data transmission sub-mode 73 in which measurement data is transmitted via the wireless transmission element 32 on an ongoing basis. In the first data transmission sub-mode 73, buffering by the first circuit part 40 may be omitted. The first operating mode 71 has a second data transmission sub-mode 74 in which buffered measurement data is transmitted via the wireless transmission element 32.

In the second data transmission sub-mode 74, data may be transmitted via the wireless transmission element 32 at a higher data transmission rate than in the first data transmission sub-mode 73. In the second data transmission sub-mode 74, the data transmission rate may be independent of the rate at which the sensor(s) capture the measurement data. In the first data transmission sub-mode 73, the data transmission rate may be dependent on the rate at which the sensor(s) capture the measurement data. In this way, the buffered measurement data may be provided to the receiver 24 more rapidly when the wireless data transmission system 30 returns to the first operating mode.

A transition from the second operating mode 72 in which no data transmission via the wireless transmission element 32 takes place to the second data transmission sub-mode 74 is triggered by a decrease in temperature.

A transition from the second data transmission sub-mode 74 to the first data transmission sub-mode 73 is triggered by a filling level of a buffer or memory. In particular, the transition from the second data transmission sub-mode 74 to the first data transmission sub-mode 73 may be triggered when all buffered measurement data has been transmitted.

A transition from the first data transmission sub-mode 73 to the second operating mode 72 in which no data transmission via the wireless transmission element 32 takes place is triggered by an increase in temperature.

While FIGS. 3 to 5 illustrate embodiments in which the same threshold temperature can be used for determining whether a transition from the first operating mode to the second operating mode takes place (i.e., whether data transmission is to pause) and for determining whether a transition from the second operating mode to the first operating mode takes place (i.e., whether data transmission is resumed), different temperature threshold values may be used to implement some hysteresis. For illustration, the wireless data transmission system 30 may transition from the first operating mode to the second operating mode when the temperature T reaches or exceeds a first threshold temperature $T_{t1}$, and the wireless data transmission system 30 may transition from the first operating mode to the second operating mode when the temperature T falls below a second threshold temperature $T_{t2}$. The second threshold temperature may be different from the first threshold temperature, for example less than the first threshold temperature.

Figure 6:
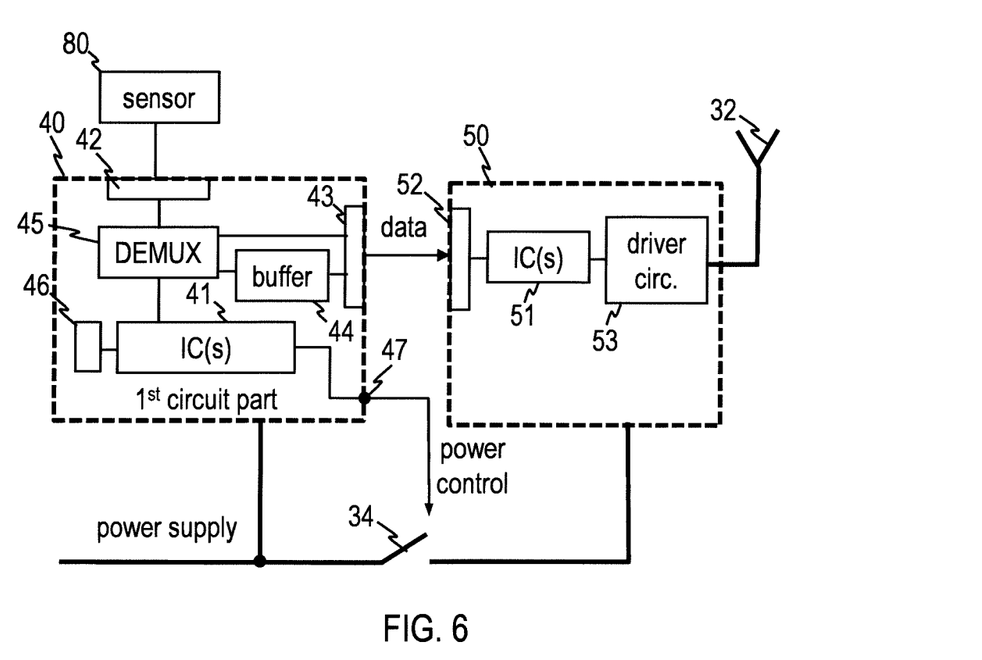
FIG. 6 is a circuit diagram of a wireless data transmission system according to an embodiment.
Figure 7:
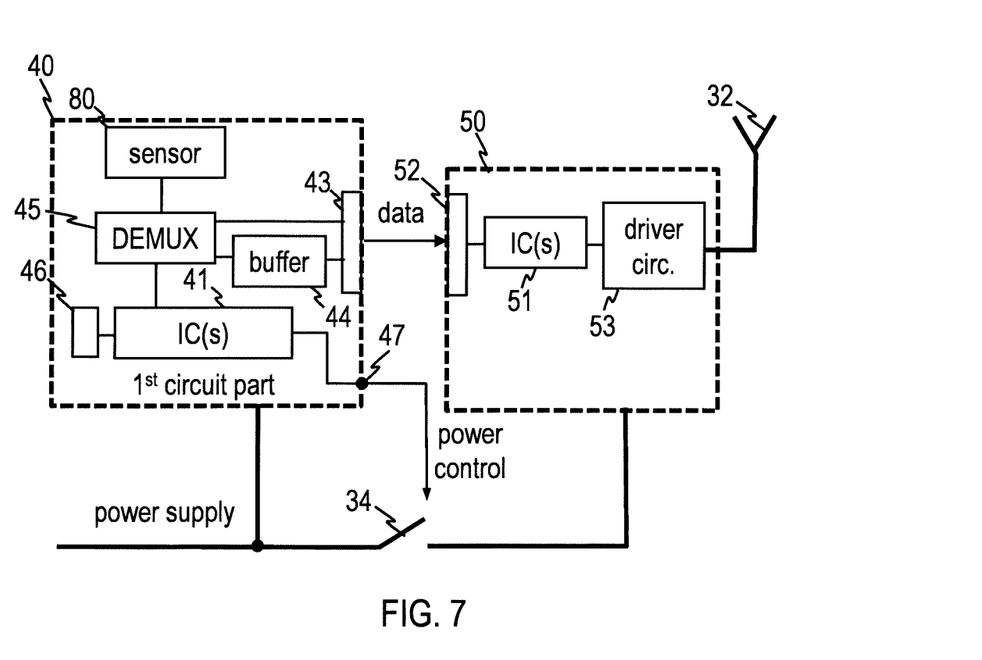
FIG. 7 is a circuit diagram of a wireless data transmission system according to an embodiment.

FIGS. 6 and 7 are circuit diagrams showing the circuit of the wireless data transmission system 30 in more detail.

The second circuit part 50 may comprise a data interface 52 for receiving measurement data from the first circuit part 40. The second circuit part 50 may comprise one or several IC(s) 51. The one or several IC(s) 51 may perform functions such as generating data symbols, modulation, redundancy functions, or other functions desired for wireless data communication. An output driver circuit 53 may be coupled between the one or several IC(s) 51 and the wireless transmission element 32, or the output driver circuit 53 may be integrated with the one or several IC(s).

The first circuit part 40 comprises one or several IC(s) 41. The one or several IC(s) 41 may generate an output at a power control terminal 47 based on sensed temperature to control the state of the electrically controllable switch 34, which may be a semiconductor switch. The one or several IC(s) 41 may control a demultiplexer 45 based on the sensed temperature to determine whether measurement data is to be output to the second circuit part 50 via a data interface 43 or whether the measurement data is to be buffered in a buffer or memory 44. The one or several IC(s) 41 may also control the outputting of buffered data from the buffer 44 to the second circuit part 50 via the data interface 43 based on the sensed temperature. The demultiplexer 45 and/or buffer 44 may be integrated with the one or several IC(s) 41.

The one or several IC(s) 41 may be adapted such that
- the potential or voltage at the power control terminal 47 is set to a level at which the electrically controllable switch 34 is closed when the temperature is below a first threshold temperature;
- the potential or voltage at the power control terminal 47 is set to a level at which the electrically controllable switch 34 is open when the temperature increased to or above the first threshold temperature; and
- the potential or voltage at the power control terminal 47 is set to the level at which the electrically controllable switch 34 is closed when the temperature falls below a second threshold temperature, which may be equal to or different from the first threshold temperature.

Thereby, the second circuit part 50 can be selectively activated and deactivated in a temperature-dependent manner.

The one or several IC(s) 41 may be adapted such that the demultiplexer 45 and buffer 44 are controlled such that
- the measurement data is passed to the data interface 43 for outputting to the second circuit part 50 without buffering in the buffer 44 when the temperature is below the first threshold temperature;
- the measurement data is buffered in the buffer 44 when the temperature increases to or above the first threshold temperature;
- the measurement data is output from the buffer 44 to the data interface 43 for outputting to the second circuit part 50 when the temperature falls to the second threshold temperature; and
- the measurement data is passed to the data interface 43 for outputting to the second circuit part 50 without buffering in the buffer 44 when the temperature is below the second threshold temperature.

The IC(s) 41 may comprise a comparator logic for performing a temperature threshold comparison. The temperature may be sensed by a temperature sensor element 46 that may be connected to the IC(s) 41 or that may be integrated with the IC(s) 41.

The measurement data is provided by one or several sensor(s) 80. The sensor(s) 80 may be provided separately from the first circuit part, as shown in FIG. 6. In this case, the first circuit part 40 may have an input interface 42 for receiving the measurement data from the sensor(s) 80. The input interface 42 may be or may comprise a digital interface. Alternatively or additionally, the input interface 42 may be or may comprise an analog interface. The wireless data transmission system 30 may be implemented as a unit that can be interfaced with a variety of different sensor(s).

As shown in FIG. 7, the sensor(s) 80 may also be integrated into the first circuit part 40. The sensor(s) 80 remain operative even when the second circuit part 50 is deactivated.

Figure 8:
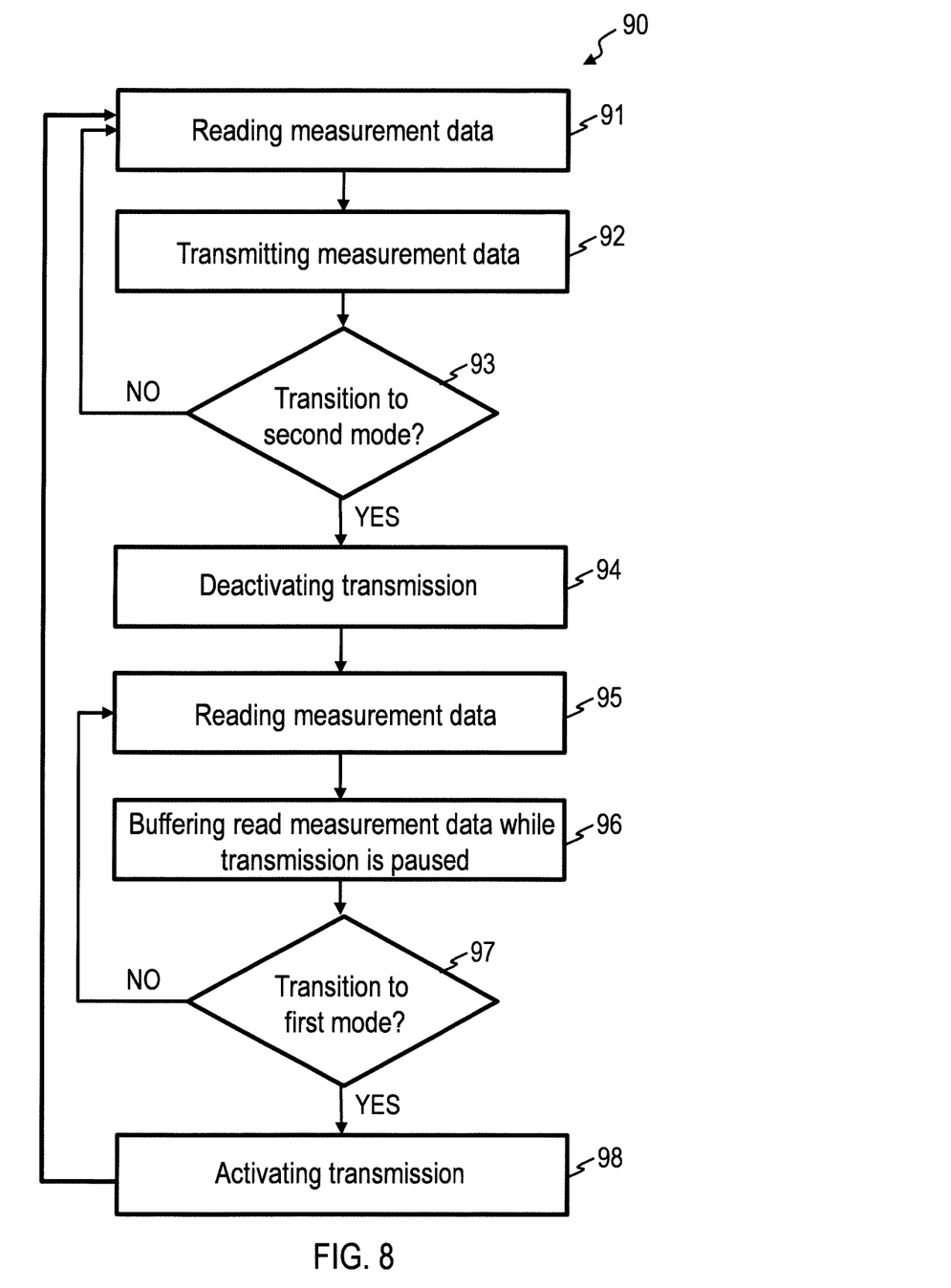
FIG. 8 is a flow chart of a method according to an embodiment.

FIG. 8 is a flow chart of a method 90 according to an embodiment. The method 90 may be performed automatically by the wireless data transmission system 30 according to an embodiment.

At step 91, measurement data are read. The measurement data may include any one or any combination of temperature, moisture or water content level, pressure, proximity, cellulose decomposition products concentrations (for example concentration(s) of one or several of: 2-furfuryl alcohol, 2-furaldehyde (furfural), 2-acetylfuran and 5-methylfurfural, 5-hydroxy-methyl-cellulose, methanol, ethanol, etc.), and/or other parameters, without being limited thereto.

At step 92, the read measurement data are transmitted.

At step 93, it is determined whether the wireless data transmission system is to transition to a second operating mode. The determination at step 93 may be temperature-based. The determination at step 93 may comprise determining whether a temperature at or in proximity to the second circuit part 50 approaches a threshold temperature at which the second circuit part 50 can no longer operate reliably (e.g., in accordance with its specs). If the determination indicates that no transition to the second operating mode is to take place, the method returns to step 91. Otherwise, the method continues at step 94.

At step 94, transmission is deactivated. This may involve deactivating the second circuit part 50 that drives the data transmission element 32.

At step 95, measurement data is read. The measurement data may include any one or any combination of temperature, moisture or water content level, pressure, proximity, cellulose decomposition products concentrations (for example concentration(s) of one or several of: 2-furfuryl alcohol, 2-furaldehyde (furfural), 2-acetylfuran and 5-methylfurfural, 5-hydroxy-methyl-cellulose, methanol, ethanol, etc.), and/or other parameters, without being limited thereto.

At step 96, the read measurement data is buffered in a buffer or memory while the transmission is paused, i.e., while the wireless data transmission system is in the second operating mode. Buffering may comprise storing time information, e.g. time stamps, in association with the buffered measurement data.

At step 97, it is determined whether the wireless data transmission system is to transition to a first operating mode. The determination at step 97 may be temperature-based. The determination at step 97 may comprise determining whether a temperature at or in proximity to the second circuit part 50 has falls to or below a threshold temperature at which the second circuit part 50 can operate reliably (e.g., in accordance with its specs). If the determination indicates that no transition to the first operating mode is to take place, the method returns to step 95. Otherwise, the method continues at step 98.

At step 98, transmission is activated. The buffered measurement data may be output to the second circuit part 50 for transmission. The method may return to step 91.

FIG. 9 shows a transformer system 10 according to an embodiment. The transformer system 10 comprises a transformer 20 having a tank 21.

A wireless data transmission system 30 has a circuit 31 that is arranged within an enclosure of a power utility and that may be operative as described above. The circuit 31 of the wireless data transmission system 30 may be arranged within the tank 21 or another transformer enclosure. The wireless data transmission system 30 may have a wireless transmission element, which may be implemented by an antenna 32. The antenna 32 may be adapted to transmit electromagnetic radiation. The wireless transmission element is provided externally of the enclosure.

An arrangement in which the circuit 31 is placed within the enclosure while being capable of driving a wireless transmission element positioned outside the enclosure of the power utility may be particularly suitable when the enclosure would strongly attenuate electromagnetic radiation at the frequency transmitted by the wireless transmission element during use.

Various effects and advantages are associated with the disclosure. The disclosure provides a possibility of monitoring a power utility in a wide range of temperatures with lower cost in comparison to fiber-optic based solutions or other conventional techniques. Monitoring of the power utility is improved. The disclosure offers on-line system monitoring, high reliability, and long-term support and service for an operator of a power utility.

The methods and systems according to the disclosure may be used in association with power transformers, without being limited thereto.

While the disclosure has been described in detail in the drawings and foregoing description, such description is to be considered illustrative or exemplary and not restrictive. Variations to the disclosed embodiments can be understood and effected by those skilled in the art and practicing the disclosed subject matter, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A wireless data transmission system for transmitting measurement data of a power utility, the system comprising:
    a transmission circuit adapted to:
    cause wireless transmission of the measurement data via at least one wireless transmission element in a first operating mode of the wireless data transmission system, and
    determine, based on a temperature sensed within an enclosure of the power utility, whether the wireless data transmission system is to transition into a second operating mode in which the wireless transmission of the measurement data is paused,
    the transmission circuit comprising:
    a first circuit; and
    a second circuit operable to drive the at least one wireless transmission element,
    the first circuit adapted to selectively activate the second circuit based on the temperature being below a temperature threshold and selectively deactivate the second circuit based on the temperature being above the temperature threshold.

2. The wireless data transmission system of claim 1, wherein the first circuit is adapted to selectively activate and deactivate the second circuit based on the temperature at and/or in proximity to the second circuit.

3. The wireless data transmission system claim 1, wherein the first circuit is adapted to selectively disconnect the second circuit from a power supply based on the temperature being above the temperature threshold.

4. The wireless data transmission system of claim 3, wherein the transmission circuit further comprises a controllable switching element interconnected between the power supply and the second circuit, the first circuit being coupled to a control terminal of the controllable switching element.

5. The wireless data transmission system of claim 1, wherein the first circuit is coupled to the second circuit via a digital data interface to provide the measurement data to the second circuit for the wireless transmission.

6. The wireless data transmission system of claim 1, wherein the first circuit comprises a first integrated circuit to:
    cause the measurement data to be provided to the second circuit for the wireless transmission in the first operating mode; and
    cause the measurement data to be stored in a buffer and/or a memory of the first circuit in the second operating mode.

7. The wireless data transmission system of claim 6, wherein the first integrated circuit is adapted to cause the measurement data stored in the buffer and/or the memory to be provided to the second circuit for the wireless transmission when the wireless data transmission system returns from the second operating mode to the first operating mode.

8. The wireless data transmission system of claim 6, wherein the first integrated circuit is adapted to cause the measurement data to be stored in the buffer and/or the memory with timing information and/or to cause the measurement data stored in the buffer and/or the memory to be provided to the second circuit with the timing information for the wireless transmission.

9. The wireless data transmission system of claim 1, wherein the second circuit comprises a second integrated circuit.

10. The wireless data transmission system of claim 9, wherein the second integrated circuit is one of a wireless communication processor and a microprocessor.

11. The wireless data transmission system of claim 1, wherein the at least one wireless transmission element is an antenna.

12. The wireless data transmission system of claim 1, wherein the wireless data transmission system further comprises a sensor to capture the measurement data and/or a digital and/or analog input interface adapted to receive the measurement data and/or a measurement signal from the sensor.

13. The wireless data transmission system of claim 1, further comprising a housing in which the transmission circuit is housed.

14. The wireless data transmission system of claim 13, wherein the at least one wireless transmission element is housed in the housing.

15. The wireless data transmission system of claim 13, wherein the at least one wireless transmission element is arranged externally of the housing.

16. The wireless data transmission system of claim 1, further comprising a temperature sensor adapted to measure the temperature is coupled to the transmission circuit.

17. An electric power utility, comprising:
    an enclosure; and
    at least one wireless data transmission system installed within the enclosure, the at least one wireless data transmission system comprising a transmission circuit adapted to:
    cause wireless transmission of measurement data of the power utility via at least one wireless transmission element in a first operating mode of the at least one wireless data transmission system, and determine, based on a temperature sensed within the enclosure, whether the at least one wireless data transmission system is to transition into a second operating mode in which the wireless transmission of the measurement data is paused, the transmission circuit comprising:

a first circuit; and a second circuit operable to drive the at least one wireless transmission element, the first circuit adapted to selectively activate the second circuit based on the temperature being below a temperature threshold and selectively deactivate the second circuit based on the temperature being above the temperature threshold.

18. The electric power utility of claim 17, wherein the electric power utility is a transformer and the enclosure is one of a transformer cabinet, a transformer housing, and a transformer tank.

19. A method comprising:

wirelessly transmitting, by a wireless data transmission system, measurement data in a first operating mode of the wireless data transmission system, the measurement data captured of a power utility, determining, by the wireless data transmission system, based on a temperature sensed within an enclosure of the power utility, whether the temperature exceeds a temperature threshold, and in response to a determination that the temperature exceeds the temperature threshold, transitioning the wireless data transmission system into a second operating mode in which wireless transmission of the measurement data is paused, the wireless data transmission system comprising a first circuit and a second circuit operable to drive at least one wireless transmission element of the wireless data transmission system, wherein the first circuit selectively activates the second circuit based on the temperature being below the temperature threshold and selectively deactivates the second circuit based on the determination that the temperature exceeds the temperature threshold.

* * * * *